United States Patent
Dai et al.

(10) Patent No.: US 7,324,518 B2
(45) Date of Patent: Jan. 29, 2008

(54) METHOD AND APPARATUS FOR TRANSMITTING WAKE-UP PACKETS OVER A NETWORK DATA PROCESSING SYSTEM

(75) Inventors: David ZhiWei Dai, Austin, TX (US); Lilian Sylvia Fernandes, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 10/455,156

(22) Filed: Jun. 5, 2003

(65) Prior Publication Data

US 2004/0246961 A1  Dec. 9, 2004

(51) Int. Cl.
*H04L 12/28* (2006.01)
*H04L 12/56* (2006.01)
(52) U.S. Cl. .................. 370/392; 713/310
(58) Field of Classification Search .................. None
See application file for complete search history.

(56) References Cited

U.S. PATENT DOCUMENTS

| | | | | |
|---|---|---|---|---|
| 6,047,378 A * | 4/2000 | Garrett et al. | ............. | 713/300 |
| 6,331,983 B1 * | 12/2001 | Haggerty et al. | ............. | 370/400 |
| 6,363,070 B1 * | 3/2002 | Mullens et al. | ............. | 370/389 |
| 6,473,411 B1 * | 10/2002 | Kumaki et al. | ............. | 370/331 |
| 7,123,620 B1 * | 10/2006 | Ma | .................. | 370/395.32 |
| 7,151,758 B2 * | 12/2006 | Kumaki et al. | ............. | 370/331 |
| 2001/0052025 A1 * | 12/2001 | Maeda | .................. | 709/238 |
| 2002/0162038 A1 * | 10/2002 | Bullman et al. | ............. | 713/323 |
| 2003/0097398 A1 * | 5/2003 | Knox et al. | .................. | 709/203 |

OTHER PUBLICATIONS

Advanced Micro Devices, Inc. White Paper, "Magic Packet Technology", Publication 20212, Rev. A, Issued Nov. 1995, pp. 1-6.
http://www.maxim-ic.com/TINIdocs/networkedmicros.cfm, "Networked Microcontrollers", Apr. 17, 2003, pp. 1-3.
http://www.microsoft.com/hwdev/tech/network/netpm.asp, "Power Management for Network Devices", Apr. 17, 2003, pp. 1-8.
http://msdn.microsoft.com/library/en-us/dndevice/html/netpm.asp?frame=true, "Power Management for Network Devices", Nov. 16, 1998, Apr. 17, 2003, pp. 1-5.
Intel 82550 Fast Ethernet Multifunction PCI/CardBus Controller, Product Brief, Intel 2001, pp. 1-2.

* cited by examiner

*Primary Examiner*—Chau Nguyen
*Assistant Examiner*—Suk Jin Kang
(74) *Attorney, Agent, or Firm*—Duke W. Yee; D'Ann N. Rifai; Wayne P. Bailey

(57) ABSTRACT

A method in a data processing system for routing a packet to a target data processing system. With the method and apparatus, a global address for the target data processing system is placed in the packet. A hop-by-hop option may then be set in the packet, which contains a media access control address for the final destination. This option causes a router for a subnet on which the target data processing system is located to send the packet to the target data processing system using the media access control address without performing a link level address discovery operation.

16 Claims, 3 Drawing Sheets

METHOD AND APPARATUS FOR TRANSMITTING WAKE-UP PACKETS OVER A NETWORK DATA PROCESSING SYSTEM

BACKGROUND OF THE INVENTION

1. Technical Field

The present invention relates generally to an improved data processing system and in particular to a method and apparatus for processing data. Still more particularly, the present invention relates to a method, apparatus, and computer instructions for transmitting packets from a source to a target.

2. Description of Related Art

In network data processing systems, remote wake-up abilities are often provided for clients. This type of feature allows a client to be turned on through the network. With this feature, a system administrator or other user may wake up a sleeping client by sending a network packet. For example, with a network adapter, such as an Ethernet controller, the adapter is modified to listen for a special wake-up on local area network (LAN) address even when the computer in which the network adapter is located is asleep in a power conservation mode. Upon receiving this packet, the network adapter checks the packet content to ensure that the packet is destined for this particular client. If the packet is destined for the client, the adapter wakes up the sleeping clients.

This type of feature may be used on a large network data processing system in which the system administrator's data processing system is located on a different subnet from the clients that are being managed. In this case, the "wake-up" packet may be forwarded by routers along the way to the client from the system administrator's data processing system. With the current version of Internet Protocol version 4 (IPv4), this forwarding of packets is managed by sending the "wake-up" packet to an IPv4 subnet-directed broadcast address for the machine that is to be woken up. When this packet reaches the router at the subnet for the target client, the router simply forwards this subnet-directed broadcast packet to the final subnet where the packet is picked up by the network adapter of the client that is to be woken up.

With Internet Protocol version 6 (Ipv6), such a mechanism does not work. This version of Internet Protocol (IP) and other types of protocols do not support subnet-directed broadcast addresses. Therefore, it would be advantageous to have an improved method, apparatus, and computer instructions for waking up a sleeping client on an IPv6 network data processing system.

SUMMARY OF THE INVENTION

The present invention provides a method in a data processing system for routing a wake-up packet to a target data processing system. A global address for the target data processing system is placed in the packet. An option is set in the packet in which this option contains a media access control (MAC) address for the final destination in the packet. This option causes a router for a subnet on which the target data processing system is located to send the packet to the target data processing system using the media access control address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
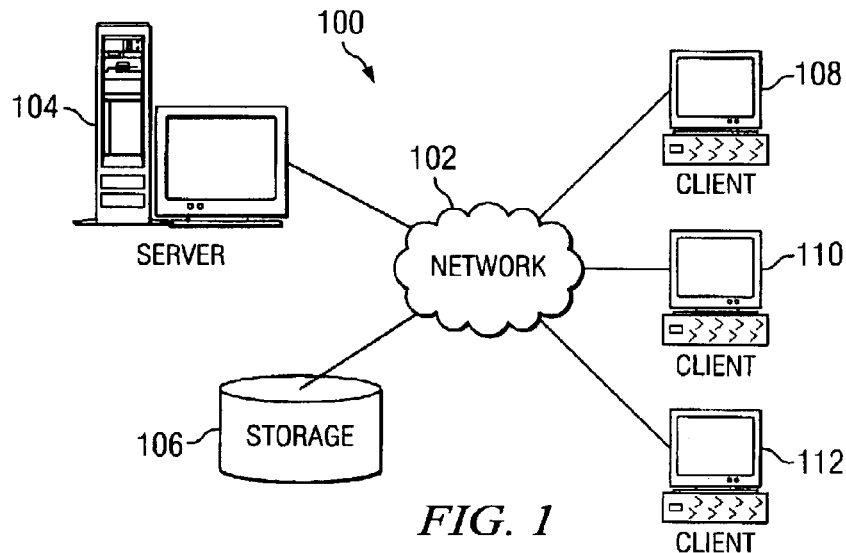
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
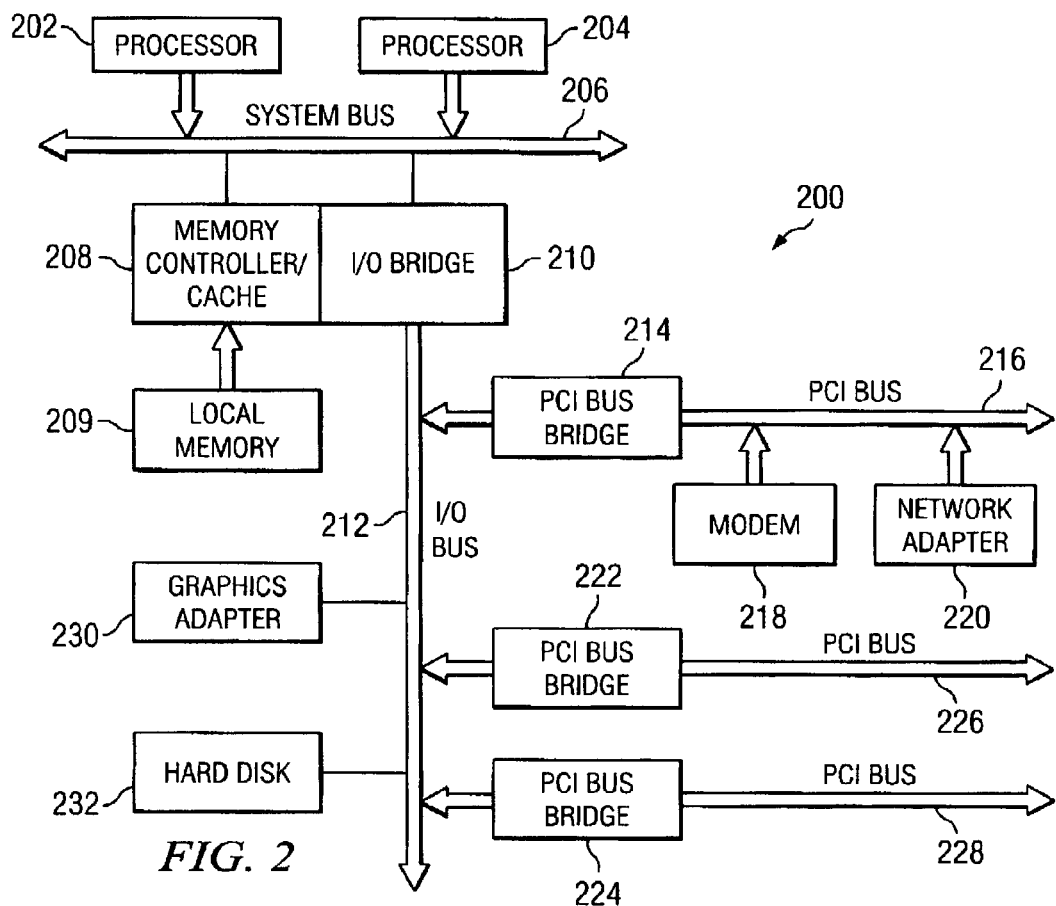
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
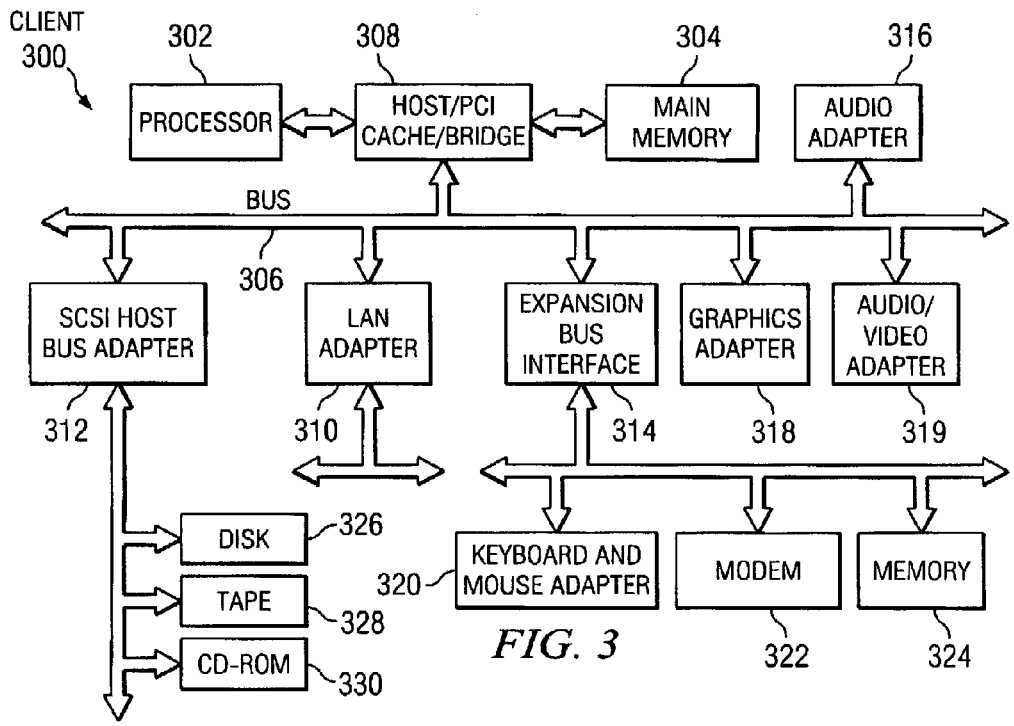
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for constructing a wake-up packet that may be forwarded by routers, correctly routing the wake-up packet to the correct subnet, and allowing the network adapter to pick up the packet even when the data processing system is in a sleep mode. In these examples, a global address of the target computer is placed in the wake-up packet. A global address is a network address that uniquely identifies a computer, such as an administrator computer or target computer, and this global address is understood throughout the network. This global address is used in Internet Protocol, version 6 (IPv6). This IP standard is described in RFC2460 and IPv6 addressing is defined in RFC2373. These and other RFCs are available from the Internet Engineering Task Force (IETF).

Further, this wake-up packet includes an extension header option, also referred to as a hop-by-hop header option. A hop-by-hop option is a protocol option in a network packet that is looked at (and possibly processed) by every router that forwards the packet along the path from the source to the destination or target. The mechanism of the present invention uses this hop-by-hop header option to indicate that the packet is a wake-up packet. The hop-by-hop header option is examined when the packet is received by a router.

Currently used routers initiate a process to obtain a media access control (MAC) address when a wake-up packet is received by a router at the target client's subnet. The MAC address is a unique hardware number identifying the target. A correspondence table (i.e. the Neighbor Cache table) is employed by routers to relate a global address to a MAC address for a computer on a network. This process, initiated by the router, also is referred to as a Neighbor Discovery Protocol (NDP). This protocol is described in RFC2461. With current routers using this process, a client using Ipv6 does not respond to this process request when the client is asleep, such as in a power conservation mode In contrast, with the mechanism of the present invention, the routers are modified to send the wake-up packet to the target client without attempting to discover a MAC address when the hop-by-hop header option is present in the wake-up packet. In a preferred embodiment of the present invention, a MAC address for the target is included in the hop-by-hop header for use in routing the wake-up packet to the target instead of initiating a discovery process, such as NDP. With the MAC address found in the hop-by-hop header option, the router sends the wake-up packet directly to the target to be woken up from the sleep or power conservation mode. In the illustrated examples of the present invention, the sender of the packet knows the MAC address ahead of time and includes the MAC address within the hop-by-hop header option. The MAC addresses may be discovered from clients when the clients are not asleep using presently available discovery processes such as NDP. These addresses may be placed in a list of addresses for client machines that are managed by an administrator or other users.

By routing the wake-up packet directly to the target, no other data processing system on the target subnet is woken up with this type of implementation. In another implementation of the present invention, the router may send the wake-up packet to a multicast address (i.e. the node's solicited-node multicast address). In this implementation, the packet is sent out on a subnet as a multicast packet. This particular implementation, however, also might wake up other clients on the subnet. With this type of implementation, a MAC address in the hop-by-hop header option is not needed.

Figure 4:
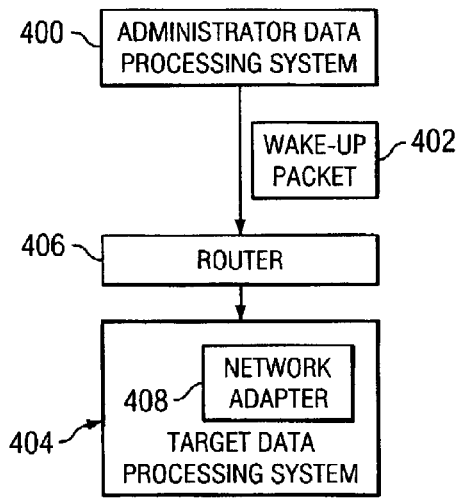
FIG. 4 is a diagram illustrating components used in routing wake-up packets to a target data processing system in accordance with a preferred embodiment of the present invention.

Turning next to FIG. 4, a diagram illustrating components used in routing wake-up packets to a target data processing system is depicted in accordance with a preferred embodiment of the present invention.

Administrator data processing system 400 generates wake-up packet 402. Administrator data processing system 400 is used to manage client data processing systems in these examples. This data processing system may be located on or remotely from the subnet in which client data processing systems are located. A user or administrator may employ administrator data processing system 400 to wake up clients to perform various tasks, such as for example updating software or performing other maintenance operations.

This wake-up packet is sent to target data processing system 404 via router 406. Wake-up packet 402 is received by network adapter 408 in target data processing system 404. The mechanism of the present invention provides a hop-by-hop header option within wake-up packet 402 to cause router 406 to send wake-up packet 402 directly to target data processing system 404 for handling by network adapter 408. A hop-by-hop header is not found in all packets. Additionally, a hop-by-hop header may also exist in a packet that is not a wake-up packet. In the depicted examples, a hop-by-hop header with a MAC address is considered a wake-up packet by router 406. Of course, other indicators may be included in the hop-by-hop header to indicate that the packet is a wake-up packet, depending on the particular implementation.

This hop-by-hop header option causes router 406 to skip initiation of a process to obtain a MAC address that corresponds to target data processing system 404's global address. This hop-by-hop header option is employed because such a process would not be successful with target data processing system in a sleep or power conversation mode.

Instead, router 406 uses the MAC address within the hop-by-hop option to send the packet directly to network adapter 408 in target data processing system 404. Router 406 in this example is a router for the subnet on which target data processing system 404 is located. Router 406 may be implemented using data processing system 200 in FIG. 2, depending on the implementation. With the global address for target data processing system 404 being placed in wake-up packet 402, this wake-up packet is sent to router 406.

Router 406 is modified to include a process to handle the hop-by-hop header option within the header. If a packet containing this header is seen by router 406, the MAC address is obtained from the header and used to direct the packet directly to the target client.

If a multicast implementation is used, the global address is used to construct an Ethernet multicast address such as 33:33:ff:12:3a:e8. This multicast address is the same multicast address that network adapter 408 listens to when target data processing system 404 joins the solicited node multicast address ff02::1:ff12:3ae8 on initial configuration.

IPv6 addresses are 128-bits long and have a scope. A scope defines which networks can see the packet. For example, a smaller scope may restrict certain routers from forwarding the packet. An address with a global scope can be forwarded by all routers. These addresses are usually constructed by using a prefix in the upper 64 bits and a well-known EUI64 ID in the lower 64-bits. This EUI64 ID is constructed from the MAC address of the machine's network interface card. For example:

Machine with Ethernet card address: 0.20.35.12.3a.e8;

IPv6 global address: 3ffe::33:220:35ff:fe12:3ae8 (Global: Valid anywhere in the Internet);

Solicited-node multicast address: ff02::1:f12:3ae8 (Solicited node multicast: Only valid on the local subnet); and Corresponding Ethernet multicast address:33:33:ff:12:3a:e8.

Every machine, when configured with an IPv6 address also joins a solicited-node multicast address that is formed by taking the low-order 24 bits of the IPv6 address and appending those bits to the well-known prefix FF02:0:0:0:0:1:FF00::/104. When the machine joins this address, its NIC card also listens to a corresponding hardware level multicast address.

After this address is set, the packet is then forwarded as an Ethernet level multicast. If the wake-up packet does not have a hop-by-hop header option with the MAC address, then the router uses the described multicast process. In this case, the router may first scans the content of the payload of the packet to determine if the packet is a wake-up packet (wake-up packets have a well known sequence of bytes in the payload). Hence, the multicast solution is not as efficient on the router. In these examples, a wakeup packet never arrives at the router as a multicast packet. The router converts it into a multicast packet.

In addition, network adapter 408 also includes a feature in which this adapter listens to a solicited node multicast address if a multicast implementation is used. This address is tagged as special and receives packets for this address even when target data processing system 404 is in a sleep mode.

In this example, administrator data processing system 400 generates wake-up packet 402 that is addressed to the global address of target data processing system 404 and sends this packet into the network.

Figure 5:
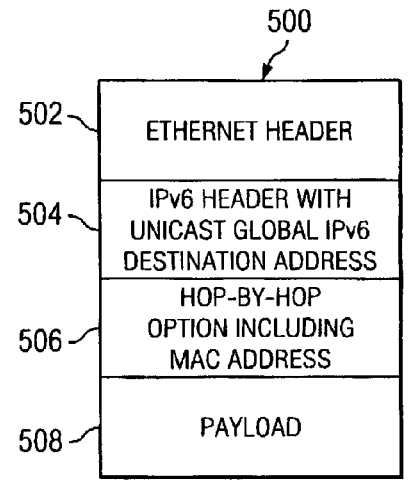
FIG. 5 is a diagram of a wake-up packet in accordance with a preferred embodiment of the present invention.

With reference to FIG. 5, a diagram of a wake-up packet is depicted in accordance with a preferred embodiment of the present invention. Wake-up packet 500 is an example of wake-up packet 402 in FIG. 4. Wake-up packet 500 includes Ethernet header 502, IPv6 header 504 that contains a unicast global IPv6 destination address, hop-by-hop header option 506, and payload 508. The global address in 504 is set for the global address of the target machine, such as target data processing system 404 in FIG. 4. Hop-by-hop extension header option 506 in this example includes a MAC address in the depicted examples. When router 406 sees hop-by-hop header option 506 set, the MAC address is obtained and used to route wake-up packet 500 directly to the target client.

Figure 6:
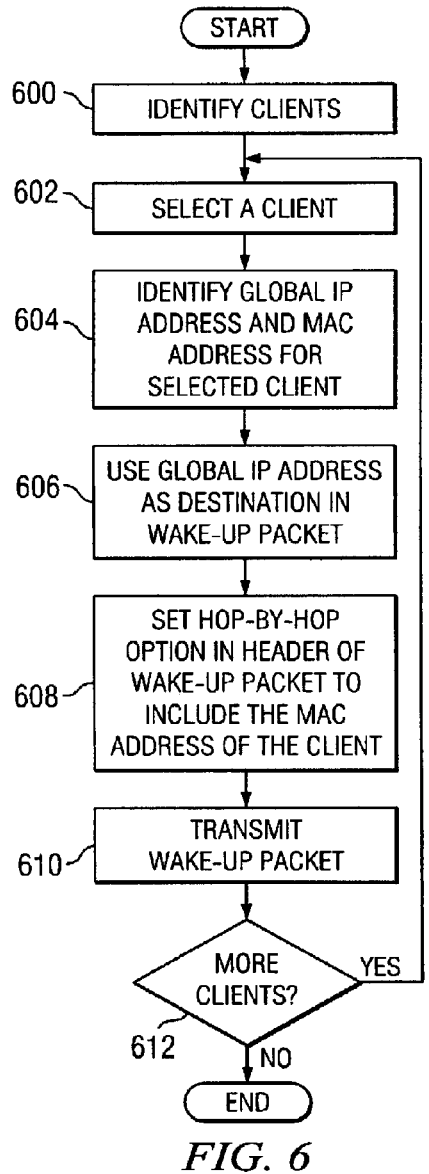
FIG. 6 is a flowchart of a process for waking up clients in accordance with a preferred embodiment of the present invention.

Turning next to FIG. 6, a flowchart of a process for waking up clients is depicted in accordance with a preferred embodiment of the present invention. The process illustrated in FIG. 6 may be implemented in a data processing system, such as administrator data processing system 400 in FIG. 4.

The process begins by identifying clients that are to be woken up (step 600). Clients may be woken up for various reasons, such as to allow an operator or administrator to perform updates or maintenance operations on the clients. Thereafter, a client is selected from the identified clients (step 602). A global IP address is identified for the selected client as well as a MAC address (step 604). Thereafter, the global IP address is used as the destination for the wake-up packet (step 606). A hop-by-hop header option is set in the header of the wake-up packet to include the MAC address of the target client (step 608). Thereafter, the wake-up packet is transmitted via the network (step 610). A determination is then made as to whether more clients are present for processing (step 612). If more clients are present, the process returns to step 602. Otherwise, the process terminates.

Figure 7:
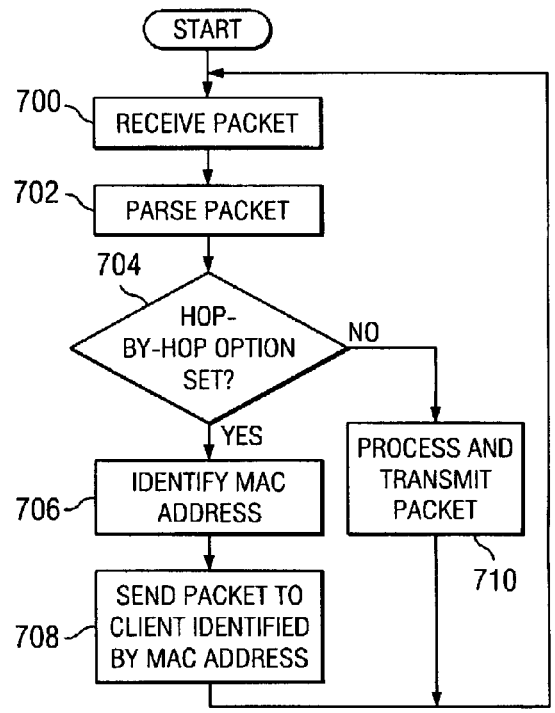
FIG. 7 is a flowchart of a process used for routing a packet in accordance with a preferred embodiment of the present invention.

Turning next to FIG. 7, a flowchart of a process used for routing a packet is depicted in accordance with a preferred embodiment of the present invention. The process illustrated in FIG. 7 may be implemented in a router, such as router 406 in FIG. 4.

The process begins by receiving a packet (step 700). The packet is then parsed (step 702). A determination is made as to whether a hop-by-hop header option is set in the packet (step 704). If a hop-by-hop header option is set, the MAC address is also identified (step 706). This MAC address is then used to send the packet to the client (step 708) with the process then returning to step 700.

With reference again to step 704, if a hop-by-hop header option is not set in the packet, then the packet is processed and transmitted normally (step 710) with the process then returning to step 700 as described above. The normal processing typically includes identifying a link-level address for the packet using a discovery process as described above.

Thus, the present invention provides an improved method, apparatus, and computer instructions for routing wake-up packets from a source to a target. The mechanism of the present invention allows wake-up packets to be sent to targets even though the IPv6 protocol used to transport the packet does not support a sub-directed broadcast address. The mechanism of the present invention also avoids having to multicast a wake-up packet within a subnet through the use of a MAC address for the target.

The mechanism of the present invention employs an option set in the header that causes the router to correctly forward the packet to the appropriate target client. More specifically, a global address for the target data processing system is placed in the packet. A MAC also is placed in the packet. A hop-by-hop header option is set in the packet. This option causes a router for a subnet on which the target data processing system is located to send the packet to the target data processing system using the media access control address. In the depicted examples, the MAC address is placed inside the hop-by-hop header option.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples, are illustrated with respect to an IPV6 protocol, the mechanism of the present invention may be applied to any other protocol having similar limitations. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for routing a packet to a target data processing system, the method comprising:

placing, by a computing device, a global address for the target data processing system in the packet;

placing, by the computing device, a media access control address in the packet; and setting, by the computing device, a hop-by-hop option in the packet, wherein the option causes a router for a subnet on which the target data processing system is located to send the packet to the target data processing system using the media access control address that is unique to the target data processing system and contained in the packet that is received by the router.

2. The method of claim 1, wherein the target data processing system is in a sleep mode, the packet is a wake-up packet and the media access control address is contained within the hop-by-hop option in the packet, and wherein the router sends the wake-up packet to the target data processing system using the media access control address contained in the packet that is received by the router to wake-up the target data processing system without initiating a process to obtain a link level address from the target data processing system.

3. A method operable within a data processing device for routing a packet to a target data processing system, the method comprising:

receiving the packet, wherein the packet is a wake-up packet;

examining the packet to determine whether a hop-by-hop option is set in the packet; and sending the wake-up packet to the target data processing system to wake-up the target data processing system without initiating a process to identify a media access control address from the target data processing system.

4. The method of claim 3, wherein the sending step comprises:

sending the packet to the target data processing system using a media access control address located in the packet that is received, wherein the media access control address is contained within the hop-by-hop option and is unique to the target data processing system.

5. The method of claim 3, wherein the sending step comprises:

sending the packet as a multicast packet.

6. The method of claim 3, wherein the target data processing system is in a sleep mode.

7. The method of claim 3, wherein the data processing system is a router.

8. A data processing system for routing a packet to a target data processing system, the data processing system comprising:
- first placing means for placing, by a computing device, a global address for the target data processing system in the packet;
- second placing means for placing, by the computing device, a media access control address in the packet; and
- setting means for setting, by the computing device, a hop-by-hop option in the packet, wherein the option causes a router for a subnet on which the target data processing system is located to send the packet to the target data processing system using the media access control address that is unique to the target data processing system and contained in the packet that is received by the router.

9. The data processing system of claim 8, wherein the target data processing system is in a sleep mode, the packet is a wake-up packet and the media access control address is contained within the hop-by-hop option in the packet, and wherein the router sends the wake-up packet to the target data processing system using the media access control address contained in the packet that is received by the router to wake-up the target data processing system without initiating a process to obtain a link level address from the target data processing system.

10. A data processing system for routing a packet to a target data processing system, the data processing system comprising:
- receiving means for receiving the packet, wherein the packet has a media access control address contained therein that uniquely identifies the target data processing system;
- examining means for examining the packet to determine whether a hop-by-hop option is set in the packet; and
- sending means for sending the packet to the target data processing system using the media access control address contained in the packet without initiating a process to identify a link level address for the target data processing system.

11. The data processing system of claim 10, wherein the target data processing system is in a sleep mode and the packet is a wake-up packet.

12. The data processing system of claim 10, wherein the data processing system is a router.

13. A computer readable medium encoded with a computer program product and executable by a computer for routing a packet to a target data processing system, the computer program product comprising:
- first instructions for placing a global address for the target data processing system in the packet;
- second instructions for placing a media access control address in the packet; and
- third instructions for setting a hop-by-hop option in the packet, wherein the option causes a router for a subnet on which the target data processing system is located to send the packet to the target data processing system using the media access control address that is unique to the target data processing system and contained in the packet that is received by the router.

14. A computer readable medium encoded with a computer program product and executable by a computer for routing a packet to a target data processing system, the computer program product comprising:
- first instructions for receiving the packet, wherein the packet has a media access control address contained therein that uniquely identifies the target data processing system;
- second instructions for examining the packet to determine whether a hop-by-hop option is set in the packet; and
- third instructions for sending the packet to the target data processing system using the media access control address contained in the packet without initiating a process to identify a link level address for the target data processing system.

15. A data processing system for routing a packet to a target data processing system, the data processing system comprising:
- a bus system;
- a memory connected to the bus system, wherein the memory includes a set of instructions; and
- a processing unit connected to the bus system, wherein the processing unit executes the set of instructions to (i) place a global address for the target data processing system in the packet; (ii) place a media access control address in the packet; and (iii) set a hop-by-hop option in the packet, wherein the option causes a router for a subnet on which the target data processing system is located to send the packet to the target data processing system using the media access control address that is unique to the target data processing system and contained in the packet that is received by the router.

16. A data processing system for routing a packet to a target data processing system, the data processing system comprising:
- a bus system;
- a memory connected to the bus system, wherein the memory includes a set of instructions; and
- a processing unit connected to the bus system, wherein the processing unit executes the set of instructions to receive the packet, wherein the packet has a media access control address contained therein that uniquely identifies the target data processing system; examine the packet to determine whether a hop-by-hop option is set in the packet; and send the packet to the target data processing system using the media access control address contained in the packet without initiating a process to identify a link level address for the target data processing system.

* * * * *